Sept. 19, 1961  L. E. SEVISON  3,000,275
JIG APPARATUS
Original Filed Jan. 10, 1952  6 Sheets-Sheet 1
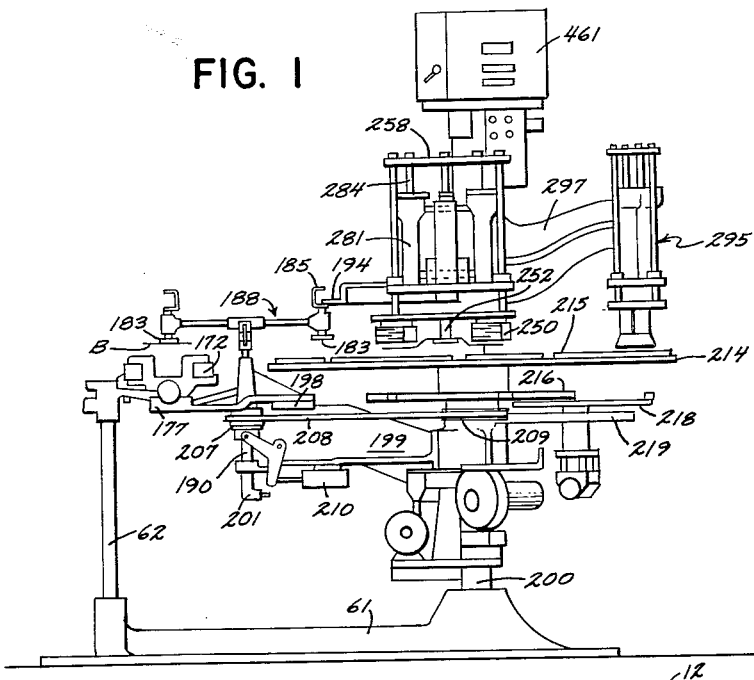
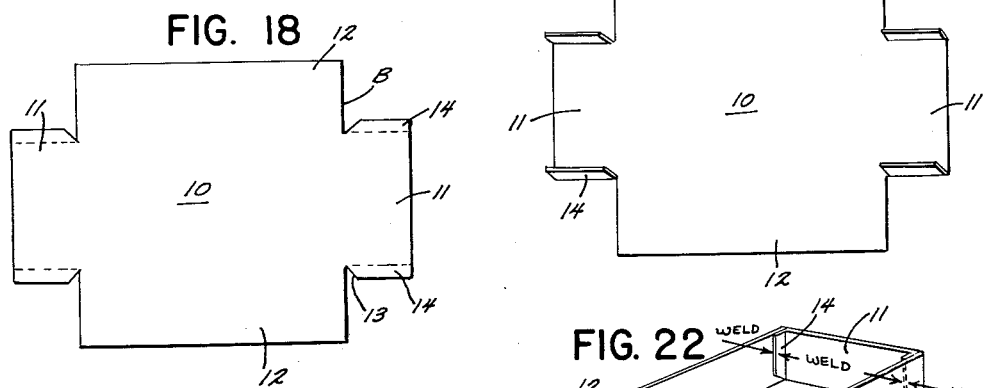
INVENTOR
LUTHER E. SEVISON
BY Ralph L. Wugger
ATTORNEY Sept. 19, 1961 L. E. SEVISON 3,000,275
JIG APPARATUS
Original Filed Jan. 10, 1952 6 Sheets-Sheet 2
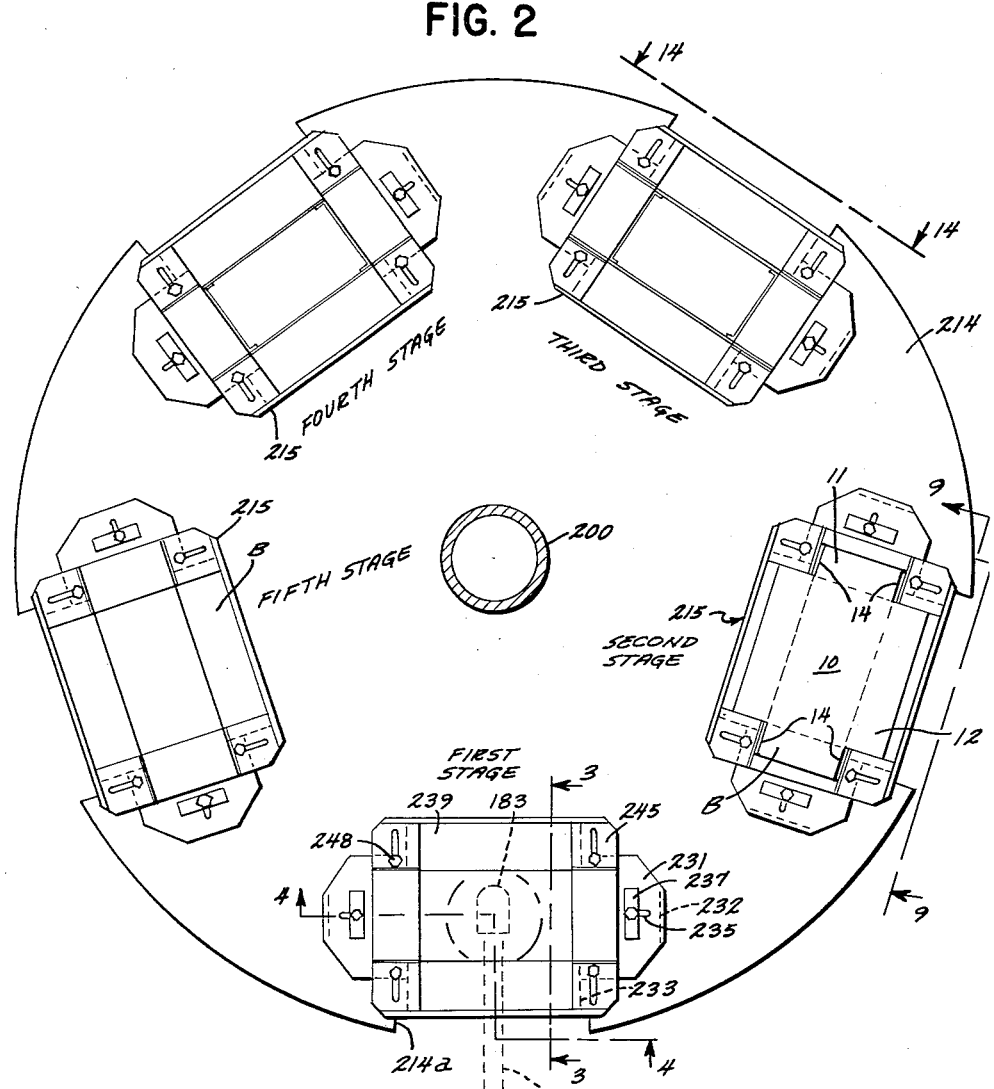
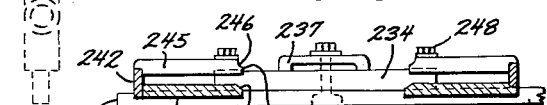
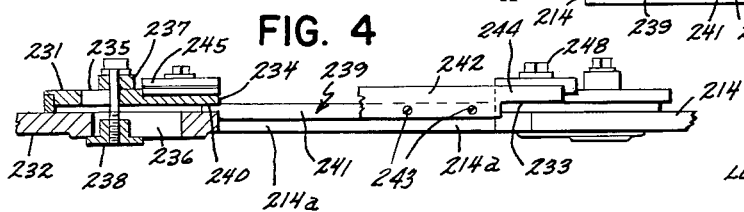
INVENTOR
LUTHER E. SEVISON
BY Ralph L. Dugger
ATTORNEY

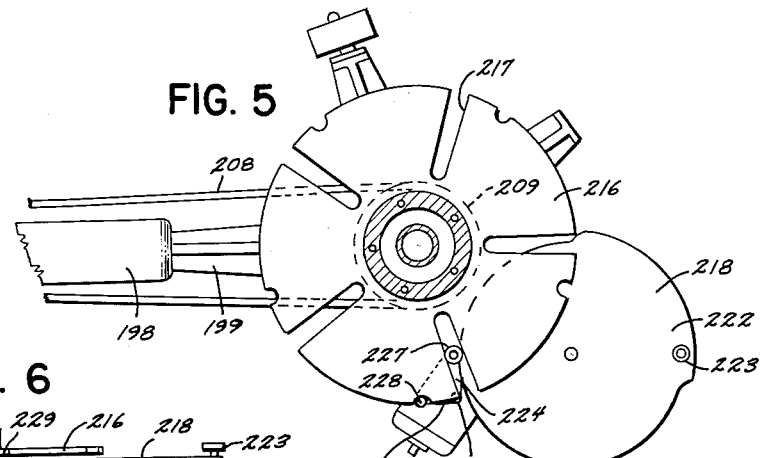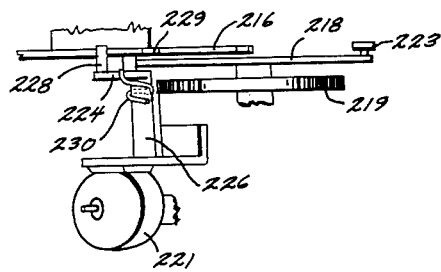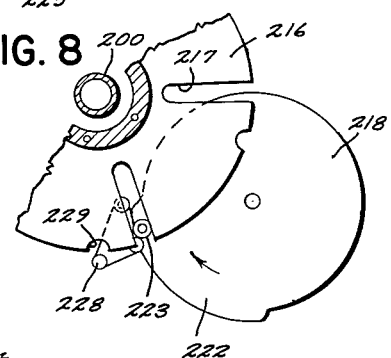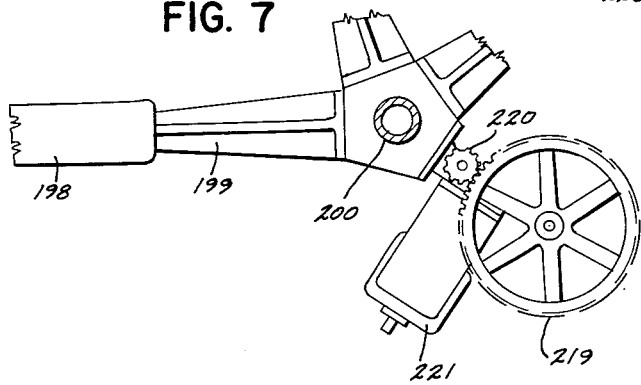

Sept. 19, 1961 L. E. SEVISON 3,000,275
JIG APPARATUS
Original Filed Jan. 10, 1952 6 Sheets-Sheet 4
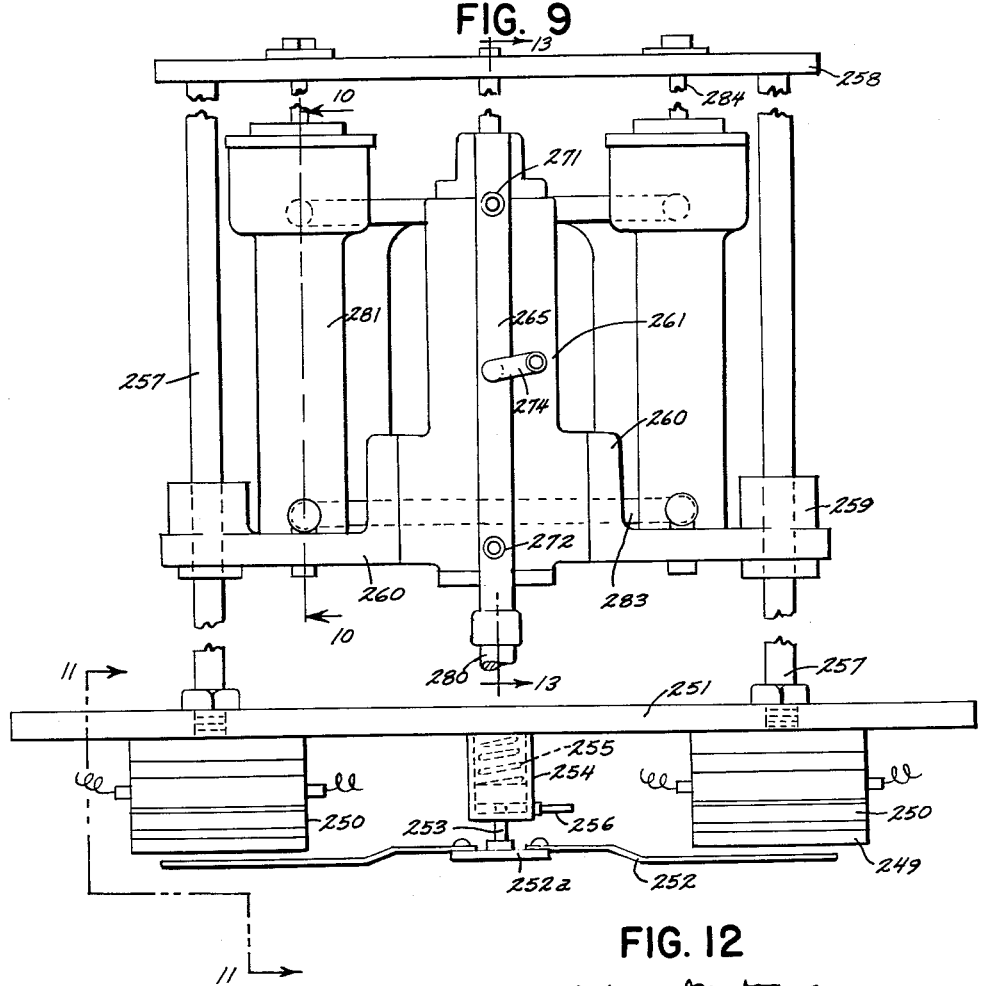
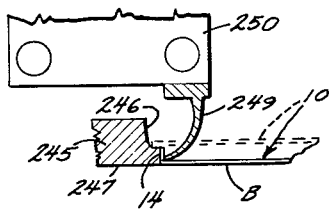
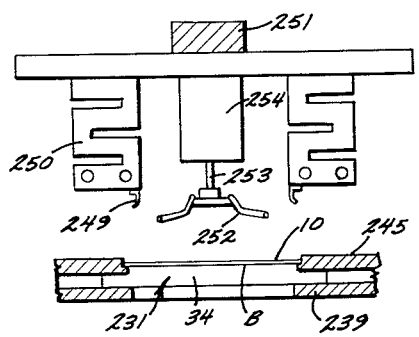
INVENTOR
LUTHER E. SEVISON
BY Ralph L. Dugger
ATTORNEY Sept. 19, 1961 L. E. SEVISON 3,000,275
JIG APPARATUS
Original Filed Jan. 10, 1952 6 Sheets-Sheet 5
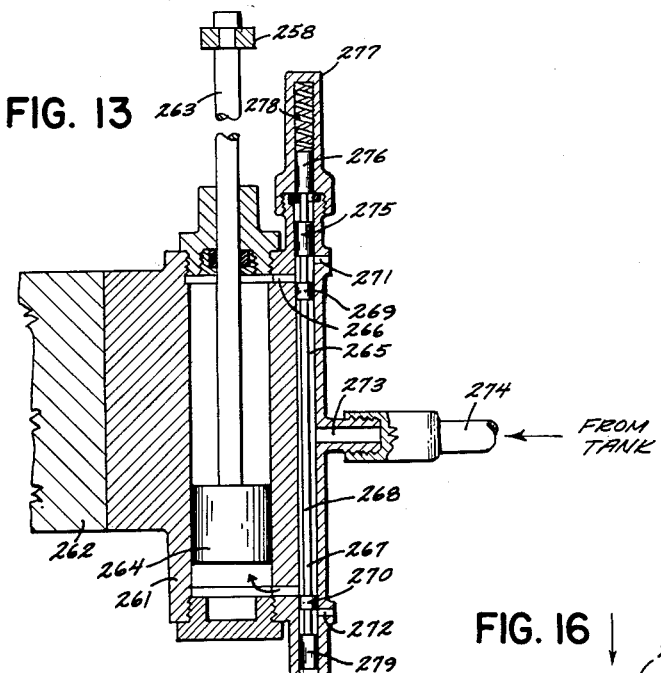
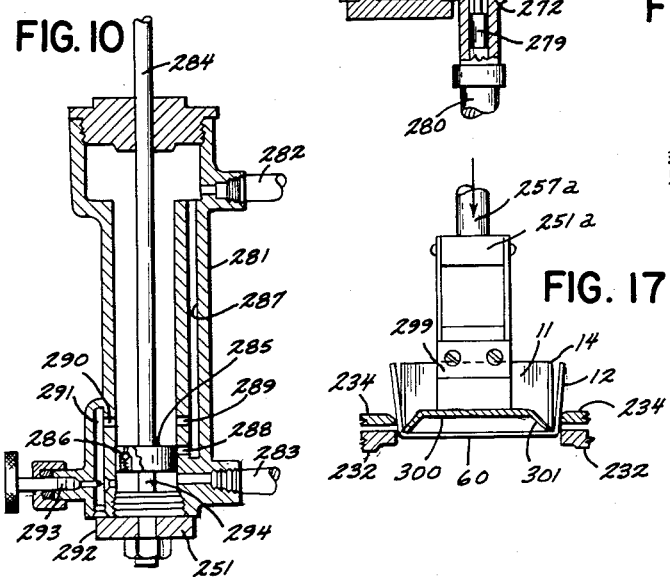
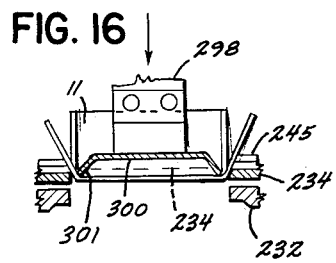
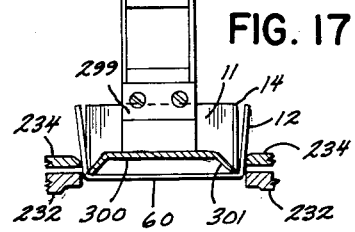
INVENTOR
LUTHER E. SEVISON
BY Ralph L. Klugger
ATTORNEY Sept. 19, 1961 L. E. SEVISON 3,000,275
JIG APPARATUS
Original Filed Jan. 10, 1952 6 Sheets-Sheet 6

INVENTOR
LUTHER E. SEVISON
BY Ralph L. Wugger
ATTORNEY

United States Patent Office 3,000,275
Patented Sept. 19, 1961

---

3,000,275
JIG APPARATUS
Luther E. Sevison, Toledo, Ohio, assignor, by mesne assignments, to Ex-Cell-O Corporation, Detroit, Mich., a corporation of Michigan
Original application Jan. 10, 1952, Ser. No. 265,734, now Patent No. 2,843,027, dated July 15, 1958. Divided and this application June 30, 1958, Ser. No. 745,440
3 Claims. (Cl. 93—51)

This invention relates generally to box making machinery and pertains more particularly to jig apparatus utilized in the several stages of folding a box blank into its ultimate box configuration. The present application is a restriction or division of my application Serial Number 265,734, filed January 10, 1952, which has issued as Patent No. 2,843,027 dated July 15, 1958.

One object of the invention is to produce for use in a box making machine a jig so constructed and arranged that the box blank may be forced by plunger means into the jig for successively effecting the desired wall folding operations.

A further object is to produce a box making machine embodying a turntable to which movement is intermittently imparted, the box folding operations being successively performed during the dwell in the movement of the turntable and the contiguous walls of the box being homogeneously united at another stage during the dwell in the movement of the turntable.

A still further object is to produce new and improved mechanism for intermittently rotating a turntable and positively locking the turntable after each indexing movement has been accomplished, thereby to insure that the turntable will be held stationary after each increment of rotation.

A still further object is to produce new and improved plunger mechanism for use in box folding operations, the construction and operation being such that the plunger moves rapidly to its work and then moves slowly during the working period, hydraulic checking mechanism insuring that this movement is achieved, and after the work has been performed, the mechanism moves abruptly away from the work.

Other objects and advantages of the invention will hereinafter appear, and for purposes of illustration but not of limitation, an embodiment of the invention is shown on the accompanying drawings, in which FIGURE 1 is a side elevation of a box making machine in which my jig apparatus is exemplified;

FIGURE 2 is a top plan view of the turntable taken in the direction of line 2—2 of FIGURE 1 with the several jigs thereon and indicating the different stages in the handling, folding and welding of the box blank, although the instant invention is concerned only with the folding stages;

FIGURE 3 is a transverse sectional view on the line 3—3 of FIGURE 2;

FIGURE 4 is a sectional view on the line 4—4 of FIGURE 2;

FIGURE 5 is a top plan view of the simulated Geneva mechanism for actuating the turntable in step by step manner;

FIGURE 6 is a side elevation of the part shown on FIGURE 5;

FIGURE 7 is a plan view showing the drive mechanism for the turntable;

FIGURE 8 is a fragmentary top plan view showing the simulated Geneva wheel unlocked and free to be driven by the rotating disc;

FIGURE 9 is a front elevation of the folding mechanism for the tabs on the end wall of the box blank, taken on the line 9—9 of FIGURE 2;

FIGURE 10 is a vertical view on the line 10—10 of FIGURE 9;

FIGURE 11 is an end view substantially on the line 11—11 of FIGURE 5;

FIGURE 12 is an enlarged sectional view showing one of the heated blades effecting the tab holding operation;

FIGURE 13 is a vertical sectional elevation on the line 13—13 of FIGURE 9;

FIGURE 16 is a sectional view showing the folding of the end walls of the box blank;

FIGURE 17 is a sectional view showing the folding of the side walls following the folding of the end walls of the box blank;

FIGURE 18 is plan view of a box blank before any folding has taken place;

FIGURE 19 illustrates one step in the forming of the box and is a plan view showing the tabs bent upwardly from the end walls of the box blank;

FIGURE 20 is a perspective view showing the end walls folded inside the side walls of the box;

FIGURE 21 is a perspective view of the folded box blank showing an embossing on the bottom wall thereof; and FIGURE 22 is a perspective view of the finished box after the tabs have been welded to the adjacent side walls.

Figure 15:
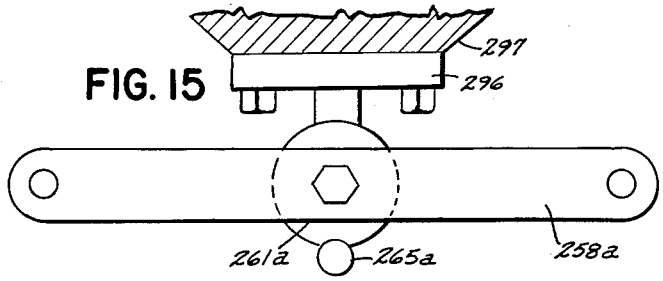
FIGURE 15 is a top plan view of the parts shown in FIGURE 14, showing particularly the manner in which the unit is mounted.

Referring first to FIGURE 18, there is depicted a box blank B, which may be of plastic material such as cellulose acetate, flexible vinylite or other suitable box-making material. As shown, the blank B has a bottom wall 10, oppositely disposed end walls 11, and a pair of oppositely disposed side walls 12. It will be observed that between the end walls 11 and the bottom wall 10, at each corner or side of the end walls are notches 13. In the succeeding steps or stages in forming the plastic box, the first operation is that of bending upwardly the tabs 14, one on each side of each of the end walls 11, the notches 13 enabling this folding action to be readily effected. In the next stage, after the tabs 14 have been folded, the end walls 11 are folded toward each other to a position at about 90° to the bottom wall 10 of the box, this being shown in FIGURE 20 of the drawings. After the upward folding of the end walls 11 of the box, the side walls 12 are then folded upwardly so that the tabs 14 lie inside of the side walls 12. In the next step or stage, the bottom wall 10 of the box is embossed, as indicated at 15 on FIGURE 21, it being understood that any suitable embossing may be effected such as is desired for advertising or other purposes. In the final stage and, as shown on FIGURE 22, the tabs 14 are welded to the side walls 12 thereby completing the formation of the sealing of the structure. The present invention, however, is concerned only with the folding of the tabs 14 which takes place at what will be called the "second stage" (see FIGURE 2) and with the folding of the end walls at what will be termed the "third stage" (also see FIGURE 3).

As an introduction to the present invention, we will assume that the blanks B are successively delivered to the jig apparatus illustrating the present invention by a vacuum pick-up device herein designated generally by the reference numeral 188 and which is fully described in my copending application referred to above.

The box blanks B are delivered by the pick-up device to a turntable 214 which is mounted for rotary movements upon a vertical post 200. As will hereinafter be described, the turntable 214 is imparted positive step by step movements and on the turntable are arranged a series of five jigs 215 to which the box blanks B are successively delivered. As the turntable 214 is indexed, the box blanks are progresively formed into boxes. Directly beneath the turntable 214 are fixed thereto for rotary movements is a semi-Geneva wheel 216 which is cylindrical in form and is provided with a series of equidistantly spaced radially disposed slots 217 which are open at their outer ends at the periphery of the wheel 216. It should be mentioned that the relatively large sheave 209 over which an endless belt 208 is trained is connected to and is coaxial with the wheel 216, and the step by step motion imparted to the wheel 216 is accordingly imparted to the sheave 209.

The Geneva wheel 216 overlaps a portion of a driving disc 218 and on the underside of the disc 218 and fixed thereto for movements therewith is a gear 219. A pinion 220 meshes with the gear 219 and the pinion 220 is connected through suitable gearing, such as a worm and wheel (not shown), to an electric motor 221. Formed on the periphery of the disc 218 is an outwardly extending cam surface 222 of uniform curvature and carried by the upper side of the cam 222 near the forward end thereof is a roller 223 suitably mounted on a vertical axis. In this instance, the cam 222 extends for approximately one-fourth of the circumference of the operating disc 218 and as the latter rotates, the roller 223 enters one of the slots 217 of the Geneva wheel. As the disc 218 rotates, it imparts turning movement to the Geneva wheel 216 in an opposite direction, it being understood that the operating disc 218 rotates in a clockwise direction (FIGURE 5) and the Geneva wheel 216 is accordingly driven in a counterclockwise direction.

After the table has been indexed or advanced to a predetermined extent through the action of the roller 223 in one of the slots 217 of the Geneva wheel, the table 214 is positively locked against further movement until the roller 223 of the actuating cam disc 218 again enters the next succeeding slot 217 in the table. For this purpose, a triangularly shaped lever 224 is pivotally mounted at one apex at 225 on a supporting post 226 disposed adjacent and below the periphery of the wheel 216. The supporting post 226 is carried by supporting frame work which surrounds the post or column 200 on the base 61. Rising from another apex of the triangular lever 224 is a roller 227, which rides along the periphery of the actuating disc 218 and the cam portion 222. The roller or follower 227 is urged into engagement with the edge portion of the disc 218 by a torsional spring 230 (FIGURE 6). At the remaining apex of the lever 224 is an upstanding locking pin 228 which is adapted to enter the adjacent notch 229 in the periphery of the Geneva wheel 216 after the follower has passed from the cam portion 222 of the actuating disc 218 to the relieved edge portion of the disc. It will be apparent that after the disc roller 223 has completed its advancing movement of the wheel 216, then the locking pin 228 enters the groove 229, thereby positively locking the Geneva wheel 216 from further rotary movement. However, when the roller 223 enters the next succeeding slot 217, the locking pin 228 is rocked or cammed away from the notch, allowing the Geneva wheel 216 and accordingly the table 214 to resume its turning movement for the predetermined extent allowed, as will be readily apparent.

From the foregoing it will be understood that the box blanks B are successively delivered by the vacuum pick-up device 188 to the turntable 214 on which are arranged in equi-distantly spaced relation five jigs 215 to which the box blanks are delivered. The mechanism is so timed that after the turntable has been indexed, a box blank is delivered to the adjacent jig 215 and upon the next advancing movement of the turntable, the next succeeding jig is freed of its box blank and is ready to receive one from the pick-up device. Since the jigs 215 are identical in construction and arrangement, description of one will suffice. The turntable is formed at its edge portions with notched apertures 214a, for the respective jigs and each jig comprises a pair of laterally spaced end plates 231, the outer end of each end plate being raised slightly from the surface of the table 214 by supporting strips 232 respectively. Extending laterally from the inner ends of the end plates 231 are strips 233 which rest in whole or in part on the table surface at the edge portions of the aperture 214a (FIGURE 4). At the inner edge of each of the end plates 231 is a downwardly curved edge portion 234 (FIGURES 3 and 4) which aids in the folding of the end walls of the box blank, as will hereinafter appear.

Each end plate 231 is laterally adjustable to accommodate different size box blanks, and as shown, the outer portion of each plate 231 is provided with an elongated slot 235, the turntable therebeneath being formed with a longitudinally elongated slot 236. Resting on the top of each end plate 231 is a bridge spacer 237 through which extends a bolt forming a part of a bolt and nut assembly 238. It will be apparent that the arrangement of the slots 235 and 236 is such as to make possible substantial adjustment of the end plates toward and away from each other.

Extending across the table opening 214a and arranged in laterally spaced relation is a pair of slide folding plates 239 and each of these plates has reduced end portions or extensions 240 which, as shown in FIGURE 4, rest upon the table 214 at the edge of the opening, so that a portion of each plate 239 extends into the table opening a short distance below the upper side thereof. The inner or facing edge portion 241 of each side folding plate is curved inwardly and downwardly for assisting in the folding of the sides of the box blank as will hereinafter appear. To the outer edge of each of the side folding plates 239 is an upright facing strip 242, the upper portion of which projects upwardly beyond the upper surface of the side folding plate. Each facing strip 242 is secured to the edge of a side folding plate by screws 243 and as shown, the facing strips are provided with reduced end extensions 244, projecting from the upper portion of the strip and fitting over or resting upon the adjacent strip 233 of the respective end plate 231.

A pair of tab folding blocks 245 are supported on each of the end plates 231, the tab blocks of each pair being spaced laterally from each other and the outer end of each tab block having an extension which rests upon an adjacent facing strip 242. The inner sides of the folding blocks 245 or those sides of each pair of blocks facing each other, have stepped edge portions which support the end walls of the box blanks. As shown, each inside edge has a sloping wall 246 which inclines inwardly to a lower horizontal ledge 247. Each tab holding block 245 is adjustably connected to the respective end plate 231 by a transverse elongated slot through which extends a screw 248 thereby to enable the blocks to be adjusted laterally of the end plates to accommodate different size box blanks.

On FIGURE 2, the several stages through which the box blank passes are indicated. In the first stage, the blank is delivered to a jig 215 in such manner that the end walls 11 (FIGURE 18) rest upon the horizontal ledges 247 of the tab folding blocks 245 and the side walls 12 of the box blank are spaced upwardly from the side folding plates 239. After the turntable 214 is indexed so that such box blank is in the second stage position, tabs 14 are folded upwardly at right angles to the end walls 11 and the mechanism for effecting such tab folding operation is shown in FIGURES 9 to 12.

Pairs of curved heated blades 249 are employed for folding the tabs 14 at substantially right angles to the end walls 11 of the plastic box blank 10. As shown on FIGURE 11, the heated blades 249 of each pair curve outwardly in opposite directions, and as will hereinafter appear, the blades 249 (there being four in number) move downwardly together, simultaneously engaging all of the tabs 14 throughout their length in the region where they join the body of the blank. As the blades continue their movement downwardly, they heat the plastic sufficiently to enable folding of the tabs 14 as they slide over the vertical surfaces of the tab folding blocks 245 directly beneath the horizontal ledges 247. As shown, the ends of the curved blades 249 are somewhat rounded in order to effect the desired wiping contact between the blades and the tabs 14. Thus the box blank B is forced downwardly a slight extent and during such downward movement, each of the four tabs on the end walls 11 are folded at right angles to the end walls, as shown on FIGURE 19.

The curved heated blades 249 are carried by heater units 250, there being one heater unit for each blade and as shown on FIGURE 11, the electric heaters being arranged in pairs and the two pairs being suitably secured to the underside of a transversely disposed connecting bar 251. Suffice it to say that the electric heaters 250 are thermostatically controlled so that the desired degree of heat is delivered in each instance and at all times to the curved blades 249. For accommodating different size boxes, the blades 249 may be suitably mounted for adjustment.

Carried by the underside of the connecting bar 251 is a stripper device to insure that the box blank does not move upwardly with the folding blades 249 when the latter retract and after the tab folding operation has been completed. As shown, a plurality of spring wire stripper arms 252, preferably four in number, are secured at their inner ends to a plate 252a which is connected to a vertically disposed rod 253 having a piston reciprocable within a cylinder 254. The cylinder 254 is secured to the underside of the connecting bar 251 and between the connecting bar 251 and the piston is a coil spring 255. Near the lower end of the cylinder 254 is a fitting from which leads a tube 256. Air under pressure is normally delivered to the tube 256 to maintain the piston elevated so that the spring 255 is normally compressed. When the assembly commences its retracting movement, the air in the line 256 is momentarily shut off so that the coil spring 255 may force the spring stripper arms 252 downwardly to bear against the box blank B just long enough to insure that the blank will not adhere to the curved blades 249 when the latter retract.

Fixed to the upper side of the transverse connecting bar 251 adjacent opposite ends thereof are vertical rods 257 which are secured at their upper ends to a horizontally disposed cross head 258. The rods 257 are slidable through and guided by stationary sleeves 259 which are carried by brackets 260 fixed to opposite sides of a vertically disposed operating cylinder 261. As shown in FIGURE 13, the operating cylinder 261 it suitably secured to a supporting arm 262 which is fixed in any suitable manner to the upright post or column 200. Secured to the cross-head 258 and depending from the central portion thereof is a piston rod 263 which extends into the cylinder 261 and has a piston 264 at its lower end. Arranged at one side of the cylinder 261 and parallel thereto is a relay valve chamber 265 of substantially smaller diameter than the cylinder 261. The valve chamber 265 communicates with the cylinder 261 at its upper and lower ends by lateral ports 266 and 267 respectively. Reciprocable within the valve cylinder 265 is an elongated relay valve 268 which has upper and lower spool portions 269 and 270 respectively controlling the admission of air under pressure from the central portion of the valve cylinder to the upper and lower ends of the operating cylinder 261. Spaced slightly above the upper lateral port 266 is an exhaust port 271 and spaced slightly beneath the lower port 267 is an exhaust port 272. Air under pressure is admitted to the intermediate portion of the valve cylinder 265 from a port 273 from which leads a tube 274 communicating with a pressure tank so that air under pressure is at all times supplied to the relay valve cylinder 265.

On the upper end of the relay valve 268, spaced upwardly from the spool portion 269 and arranged above the exhaust port 271 is an elongated spool portion 275. Spaced above the spool portion 275 is an elongated piston-like end portion 276 which is reciprocable with a cylinder formed in a cap 277. The cap 277 is in screw-threaded engagement with the upper end of the relay valve cylinder and disposed within the cap 277 is a coil spring 278 which normally urges the relay valve downwardly to the position shown in FIGURE 13. In such position, air under pressure from the tank passes through the tube 274 and port 273, relay valve cylinder 265 and port 267, to the lower end of the cylinder 261, thereby normally to urge the piston 264 upwardly and retain it in its raised or elevated position.

Spaced from the lower spool portion 270 of the relay valve and disposed below the exhaust port 272 is a piston-like end portion 279. For admitting air under pressure, at the lower end of the relay valve cylinder is a tube 280 leading from the timing valve mechanism and joined to the tube 256 which controls the retraction of the stripper arms 252. When, as will hereinafter appear, air from the timing valve is introduced into the tube 280, it overcomes the pressure of the spring 278 and moves the relay valve upwardly, opening the lower end of the cylinder 261 to the exhaust port 272, and enabling air from the tank to enter the upper end of the cylinder 261 through the port 266, the spool portion 269 having been moved upwardly sufficient to uncover the port 266. From the above description, it will be manifest that the piston 264 is normally held in its raised position since the spring 278 holds the relay valve in such position that air enters the lower part of the operating cylinder 261.

Referring to FIGURE 9, a hydraulic check device is disposed on opposite sides of the actuating cylinder 261, for controlling the movement of the piston rod 263 and the associated parts. It is desirable for the parts to move upwardly or retract rapidly and to advance toward the work rapidly until a certain point in the travel is reached, whereupon the movement is progressively retarded. Retarding of the movement is desired about the time when the curved heated blades 249 engage the box blank B to perform the work thereon. As shown in FIGURE 9, a control cylinder 281 is arranged at opposite sides of the actuating cylinder 261 and these cylinders are suitably mounted on the brackets 260. The enlarged upper ends of the cylinder 281 are connected by a tube 282 and the lower ends of these cylinders are connected by a tube 283. Extending from the upper ends of each cylinder 281 is a piston rod 284. The upper end of which is secured to the crosshead 258.

Since the two check devices are identical in construction, description of one is regarded as sufficient. As shown in FIGURE 10, a piston 285 is connected to the lower end of each piston rod 284 and is reciprocable within the cylinder 281. Formed in the piston 285 is a spring-tensioned ball check valve 286 which moves to its seat when the piston moves downwardly within the cylinder but which is unseated upon the upward movement of the piston. At one side of the cylinder is a vertically elongated passage 287 which opens at its upper end into the enlarged upper end portion of the cylinder 281. The bottom end of the passage 287 communicates with the interior of the cylinder 281 by a lateral port 288. Spaced a short distance above the port 288 is a port 289 and directly opposite the port 289 is a port 290 connecting the interior of the cylinder 281 with a vertical passage 291 arranged parallel to the cylinder but extending a short distance from the port 290 to the bottom end of the cylinder. At the lower end of the cylinder 281 and aligned with the tube 283 is a port 292 communicating with the passage 291, the port 292 being controlled by a manually operated needle valve 293. Downward movement of the piston 285 is limited by a stop pin 294 which stops the movement of the piston at a point just above the connection of the tube 283 and the lateral port 292.

In the operation of the check cylinder, it will be understood that when the piston 285 moves downwardly, the liquid within the cylinder in advance of the piston is forced out through the ports 288 and 289 and passes upwardly through the passage 287 to the enlarged upper end of the cylinder as a reservoir. The two cylinders, being connected at the top and bottom, also provide for flow of the liquid to and fro and thereby equalize the liquid volume and pressure. The downward movement of the piston 285 is relatively rapid until it passes the ports 289 and 290, whereupon the flow of liquid from below the piston is restricted and must pass through the port 288, thus retarding the movement of the piston. At the very end portion of the downward movement of the piston 285, the port 288 is covered, thereby even more retarding the piston movement and thereupon liquid must pass through the port 292 upwardly through the passage 291 and back above the piston 285 through the lateral port 290. This final movement of the piston 285 may be controlled by adjusting the position of the needle valve 293. It will be obvious that when the piston 285 moves upwardly and the ball check valve 286 is unseated, the movement may be relatively rapid, thereby enabling an abrupt return of the parts to their raised or inoperative position.

From the above description, it will be apparent that in the second stage (FIGURE 2), the two tabs on each of the end walls 11 of the plastic box blank are folded upwardly at substantially right angles. This movement is effected pneumatically, the heated curved blades 249 simultaneously contacting the end walls at the line of bend and applying sufficient heat to the plastic material to enable the fold of the tabs to be readily effected. The mechanism moves down rapidly until it closely approaches the box blank, whereupon the hydraulic check means (FIGURE 10) becomes effective in more and more retarding the movement during the time when the blades engage the blank and the folding action is effected due to the downward movement of the blank in the jig 215. After the four tabs have been simultaneously folded and due to the operation of the timing valve mechanism hereinafter to be described, the air pressure to the relay valve is shut off, allowing the spring 278 to return the relay valve to its normal or lower position and enabling air from the line 274 to enter the operating cylinder 261 beneath the piston 264 and return it abruptly to its raised or inoperative position, the check pistons 285 being enabled to move upwardly rapidly as above described. When the air for the relay valve 265 is cut off from the tube 280, the air is also cut off from the stripper cylinder 254, so that the stripper arms 252 move down to strip the box blank at the same time the piston 264 starts upwardly. The stripper fingers 252 insure that the box blank will remain in the jig when the mechanism retracts. It will be understood that the above described operation takes place during a pause in the movement of the turntable 214. After that operation has been completed, the turntable 214 is indexed to move the jig carrying the box blank with upwardly folded end wall tabs 14, to the third stage as shown on FIGURE 2, where the end walls and side walls of the box blank are successively folded to positions at right angles to the bottom wall.

Figure 14:
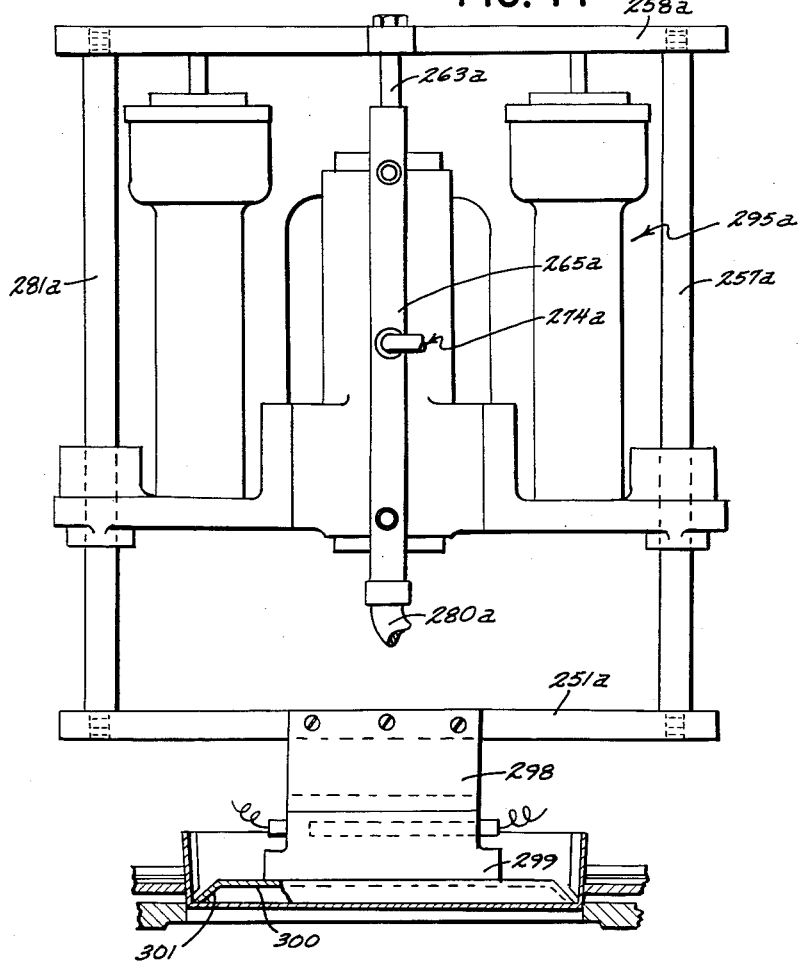
FIGURE 14 is a front elevation showing the mechanism for folding the end and side walls of the box and taken on the line 14—14 of FIGURE 2.

The mechanism for folding the end walls 11 and side walls 12 of the box blank which is operative in the third stage is shown particularly on FIGURES 14 to 16. The pneumatic operating mechanism including the hydraulic check or control device is generally indicated by the reference numeral 295 and since this mechanism is, in the main, identical to that employed in the second stage and illustrated on FIGURES 9, 11 and 12, the same reference numerals are employed in connection with the third stage except each is given the exponent "a." As shown, the bracket 296 for the operating cylinder 261a is secured to a supporting arm 297 which in turn is secured to and radiates from the tubular supporting column 200 of the machine. Embracing opposite sides of the horizontal connecting bar 251a are parallel heater supporting plates 298 which are fastened at their upper ends to the sides of the bar 251a and depend therefrom. The plates 298 support an electric heater 299 which is of any suitable construction preferably thermostatically controlled in order to provide a uniform heat of a predetermined degree sufficient to render the plastic of the box blank sufficiently pliable to make the desired folds, as will be readily understood. At the bottom end of the heater 299 is a flat horizontally disposed plate 300 of heat conductive material, the plate being rectangular in shape and having downwardly and outwardly inclined side walls 301, the free edges of which outline the bottom wall of the plastic box to be formed.

In operation, it will be understood that during the dwell or pause in the indexing movement of the turntable 214, the bar 251a and the heater parts depending therefrom move downwardly in response to the movement of the piston of the operating cylinder, first relatively rapidly and then more and more slowly after the heated inclined walls 301 have engaged the box blank and imparted downward movement thereto. During such downward movement of the plastic box blank, it will be understood that the end walls 11 first ride over the curved folding edge portions 234 of the jig whereby the end walls are simultaneously moved upwardly to a position substantially perpendicular to the bottom wall of the box blank and thereafter the side walls 12 of the box blank ride over the curved edge portions 241 of the jig to effect the folding of the side walls. In this manner, it will be apparent that the tabs 14 of the end walls 11 are positioned on the inside of the side walls 12. Thus, the box is completely formed except for securing the tabs 14 to the side walls, the latter operation being performed in the fifth stage after a fourth stage embossing operation if an embossing operation is desired. The fourth and fifth stage operations are not pertinent to the present invention and are not herein described since a full description thereof has been given in my said application serial number 265,734.

Thus, at the conclusion of the third stage the box is completely formed except for securing the tabs to the adjacent walls. It is when in this condition that the fourth stage embossing operation takes place, the box then appearing with the embossing on the bottom wall in FIGURE 21. To illustrate the final appearance of the box after the fifth stage welding operation, FIGURE 22 has also been included herein.

It is to be understood that numerous changes may be effected in details of construction, arrangement, operation and choice of materials without departing from the spirit of the invention, especially as defined in the appended claims.

What is claimed is:

1. In a plastic box machine, a support, a jig on said support adapted to receive flat box blanks having side and end walls and tabs on opposite sides of each end wall, said jig having a pair of laterally spaced end folding plates, a pair of laterally spaced blocks on each end plate, shouldered portions on the facing sides of each pair of blocks and against which the tabs are adapted to rest respectively, a pair of laterally spaced side folding plates arranged at right angles to said end plates and below the plane of said end plates, plunger means having a heated element engageable with the juncture of the end walls and tabs for rendering the latter foldable, said plunger means movable sufficiently to force the tabs over the shouldered portions for folding same at right angles to the end walls, and other plunger means having heated elements for enabling folding of the side and end walls, said other plunger means pushing the box blank progressively into the jig and forcing the box end walls first over the end plates to fold same upwardly and then the side walls over the side plates to fold same against the end wall tabs and means for positioning said plunger, said other plunger, and said jig relative to each other to alternately move one of the plungers toward and away from the jig and then alternately move the other plunger toward and away from the jig.

2. The organization as claimed in claim 1, comprising stripper means movable with said first plunger means for militating against the box blank adhering thereto.

3. The organization as claimed in claim 1, comprising pneumatic means for actuating each plunger means, and hydraulic check means associated with each pneumatic means for enabling each plunger to move quickly to the work and then slowly during the working period, and retract abruptly upon completion of the work.

References Cited in the file of this patent

UNITED STATES PATENTS

| | | |
|---|---|---|
| 2,132,859 | Mednick et al. | Oct. 11, 1938 |
| 2,556,605 | Taber | June 12, 1951 |
| 2,600,954 | Bardet | June 17, 1952 |
| 2,627,629 | Triolo | Feb. 10, 1953 |
| 2,655,843 | Baker et al. | Oct. 20, 1953 |
| 2,657,595 | Shaff | Nov. 3, 1953 |
| 2,794,373 | Lindsay et al. | June 4, 1957 |
| 2,844,077 | Buhrke | July 22, 1958 |
| 2,848,926 | Gschwind et al. | Aug. 26, 1958 |

OTHER REFERENCES

Taber: "Plastic Fabricating Machine," (Copy in Div. 15) (middle inside sheet pamphlet).